United States Patent [19]

Windhager

[11] 4,306,996

[45] Dec. 22, 1981

[54] ELECTROCONDUCTIVE POLYMER COMPOSITION

[75] Inventor: Robert H. Windhager, Pittsburgh, Pa.

[73] Assignee: Calgon Corporation, Pittsburgh, Pa.

[21] Appl. No.: 146,713

[22] Filed: May 5, 1980

[51] Int. Cl.$^3$ .............................................. H01B 1/00
[52] U.S. Cl. ................................. 252/500; 106/14.5; 252/518; 428/514; 428/451; 430/69; 430/270; 260/37 R
[58] Field of Search ...................... 252/500, 518, 8.8; 430/69, 270; 526/1; 260/567.6 H, 567.6 R, 567.6 M; 428/514, 447, 449, 451; 106/14.5

[56] References Cited

U.S. PATENT DOCUMENTS

| | | | |
|---|---|---|---|
| 3,544,318 | 12/1970 | Boothe et al. | 430/69 |
| 3,925,074 | 12/1975 | Wyhof | 430/69 |
| 3,953,374 | 4/1976 | Windhager | 252/518 |
| 3,966,987 | 6/1976 | Suzuki et al. | 252/500 |
| 4,011,176 | 3/1977 | Saunders et al. | 252/500 |
| 4,084,034 | 4/1978 | Jansma et al. | 252/500 X |
| 4,093,564 | 6/1978 | Noll | 252/518 |
| 4,126,468 | 11/1978 | Kitteridge et al. | 430/270 |
| 4,132,674 | 1/1979 | Hwang | 252/500 |

*Primary Examiner*—J. L. Barr
*Attorney, Agent, or Firm*—Mario A. Monaco; Martin L. Katz

[57] ABSTRACT

An electroconductive polymer composition containing an electroconductive polymer and an agent that imparts improved tack properties to paper coated with the composition.

3 Claims, No Drawings

ELECTROCONDUCTIVE POLYMER COMPOSITION

This invention relates to an electroconductive polymer composition which has improved tack properties and processes for preparing and using such composition. Such composition may be applied to paper raw stock, surface sized and non-surface sized, and the resultant coated paper will have solvent holdout, conductivity and tack properties that are acceptable as electroconductive base stocks for electrographic and electrophotographic papers.

In general, electroconductive base sheets for use in the manufacture of electrographic and electrophotographic reproduction papers are prepared by applying to one or both surfaces of a suitable paper substrate (a publication grade paper of basis weight in the range of 30 to 45 pounds per 3,000 square feet) a resinous conductive layer to render the paper electroconductive. Commonly, the conductive layer comprises an electroconductive polymer either alone or more usually, formulated with a binder (normally a water-soluble, non-conductive, film-forming polymer such as a protein, starch styrene-butadiene latices, a modified or converted starch, casein, polyvinylacetate, polyvinylalcohol, copolymer of ethylene and vinylacetate, and the like) and with a pigment (such as calcium carbonate, kaolin clay, titanium dioxide, alumina or a combination of these materials). In the electrostatic paper industry, such formulations including a conductive agent, a binder and a pigment are commonly referred to as coating formulations or compositions.

The binders in conventional conductive coating formulations serve to make the paper less porous, more uniform, to improve the adherence of the conductive layer to the base paper and, importantly, to impart to the conductive layer the properties of a holdout or barrier coating to prevent solvents employed in the later applied photosensitive or dielectric layers from penetrating into the conductivized paper. A separate non-conductive solvent holdout layer comprising one or a mixture of conventional binders may be applied to the paper prior to the application of the conductive layer in order to assist in achieving a solvent holdout effect. Solvent holdout to toluene and, in some cases, parafinic solvents is essential because the top side of a conductive base paper comes into contact with toluene during the subsequent application of the photosensitive or dielectric coating which comprises dye-sensitized zinc oxide or dielectric resin dispersed in toluene and a binder. In some cases, the back side of the zinc oxide or dielectric coated base stock (now referred to as finished Electrofax or dielectric paper) comes into contact with kerosene during the copying process inside copy machines that use "wet" toners which are comprised of carbon particles suspended in a solution of kerosene and binders. The usual type of electroconductive polymer in combination with the usual type of coating additives, such as the binders and pigments mentioned above, will not have acceptable tack properties when applied at commercially feasible coatweights of from 1 to 4 pounds of coating per 3,000 square feet per paper surface. In many cases, particularly in high relative humidity environments, the paper jams inside the machine resulting in annoying and time-consuming delays.

The instant invention is based upon applicant's discovery that the tack properties of conventional electroconductive polymers commonly employed in such formulations can be markedly enhanced by incorporating into such polymers an effective quantity of an agent of the type hereinafter described that imparts non-tackiness or lubricity to the coated paper. Applicant has found that the improved polymer composition of this invention will give to the conductive base sheet conductivity, zinc oxide and dielectric resin topcoatability, rebrokability of broke and solvent holdout properties and low tack that are commercially acceptable for the manufacture of electrographic and electrophotographic papers according to current industry standards and practices when applied to a non-surface sized raw stock (a raw stock that has no surface treatment of starch, alginate or other surface sizing material), as well as barrier coated raw stock. The improved polymer composition of this invention, therefore, posesses temperature stability and provides solvent holdout and reduced tack properties. It is contemplated, therefore, that suitable coatweights of the improved polymer composition of this invention will be employed in the manufacture of electroconductive base sheets suitable for the preparation of electrophotographic and electrographic papers.

The nature of the electroconductive polymer component of the improved polymer composition of this invention is not critical. Any of a variety of electroconductive polymers, both cationic and anionic, may be employed provided that the conductive polymer selected is capable of imparting adequate conductivity to the base raw stock (industry requirements for conductivity in most base sheets are $10^8$ to $10^{10}$ ohms per square at 20 percent relative humidity). As cationic electroconductive polymers, there may be employed any water-soluble cationic polymer containing quaternary ammonium functional groups. Included in such cationic polymers are those which predominently contain mer units of the formula:

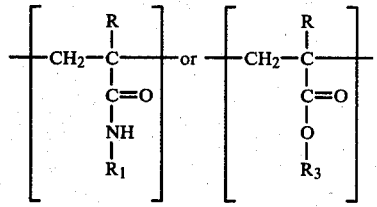

wherein:
R stands for hydrogen or lower alkyl;
$R_1$ represents a member of the class composed of

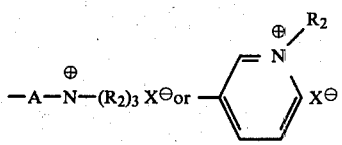

wherein, in turn:
A represents a lower alkylene, an hydroxy-lower alkylene or lower-alkyl-substituted lower alkylene group;
$R_2$ stands for a lower alkyl group; and
X is an anion.
These polymers include those wherein the quaternary ammonium functional group is carried as a pendant group to the principal polymer chain, such as, for example, polyvinyl benzyl trimethyl ammonium chloride and poly(methacryloyloxyethyl trimethyl ammonium chloride). Also useful are those polymers wherein the quaternary ammonium functional group is incorporated in a cyclic structure which comprises a portion of the polymer backbone, such as, for example, polymers containing repeating units of the formula:

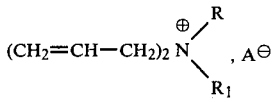

wherein
R is an alkyl group of 1 to 18 carbon atoms;
$R_1$ is R or $\beta$-propionamido; and
A is an anion.

A preferred polymer of this class is poly(diallyldimethylammonium chloride); and those wherein the quaternary ammonium functional group forms a part of the polymer chain, such cationic polymers being commonly designated as "ionenes".

Included in this group, for example, are ionene polymers prepared from halo alkyl dialkyl amine monomer units, such as 3-ionene(poly-dimethylpropylammonium chloride), prepared by the polymerization of 3-chloropropyl dimethyl amine, and ionene polymers prepared from di-tertiaryamines and dihalides, such as 3,4-ionene which is prepared from 1,3-bisdimethylamino propane and 1,4-dichlorobutene. Other ionene polymers, of course, which are prepared similarly, may be employed as the electroconductive component of the polymer composition of this invention.

In addition to the cationic electroconductive polymers mentioned above, water-soluble cationic phosphonium and sulfonium polymers also may be employed as the electroconductive component in the polymer composition of this invention. Included among these are polymers such as, for example, poly(2-acryloxyethyldimethyl sulfonium chloride) and poly(glycidyltributyl phosphonium chloride) and the like.

Water-soluble anionic polymers useful in the preparation of the polymer composition of this invention typically are polymeric acids and alkali metal and alkaline earth metal salts. Included among such anionic polymers are, for example, poly(sulfostyrene), poly(allyl sulfonic) acid, sulfonated urea-formaldehyde resin, sulfonated polymethylolacrylamide and the like.

It should be noted that the typical cationic and anionic polymers mentioned above may contain one or more other mer units. For example, copolymers such as the copolymer of diallyldimethylammonium chloride and diacetone acrylamide or N-methylolacrylamide or the copolymer of styrene and maleic anhydride also can be used as the electroconductive component of the polymer composition of this invention. The ratio of mer units in such copolymers will be determined by the quantity of cationic or anionic necessary to impart the desired surface resistivity to the base sheet.

Although any of the electroconductive polymers noted above or other electroconductive polymer capable of imparting the necessary degree of surface resistivity to the base sheet may be employed as the electroconductive component in the improved polymer composition of this invention, the preferred electroconductive polymers are the cationic polymers and copolymers and especially cationic quaternary ammonium polymers and copolymers. Of these, the most preferred polymers are poly(diallyldimethylammonium chloride), copolymers of diallyldimethylammonium chloride containing at least 70 percent by weight diallyl monomer as, for example, copolymers with diacetone acrylamide or N-methylolacrylamide, polyvinylbenzyl trimethyl ammonium chloride, polymethacryloyloxyethyl trimethyl ammonium chloride, polymethacryloyloxytrimethylammonium methosulfate, polyepichlorohydrin 80 to 100 percent quaternized with trimethylamine or dimethylamine copolymers of acrylamide and methacryloyloxyethyl trimethyl ammonium chloride containing from 90 to 99.5 percent methacryloyloxyethyl monomer and poly(methacryloyloxyethyl dimethyl hydroxyethyl ammonium chloride).

The agent that imparts nontackiness or lubricity to the coated paper is an organic silicone additive such as dimethylpolysiloxane.

The improved electroconductive polymer composition of this invention may also contain a fluorosurfactant to enhance the solvent holdout properties of the polymer composition. Certain mono- and bis-(1H,1H,2H,2H-perfluoroalkyl)-phosphate esters, when incorporated into electroconductive polymer compositions in the quantities specified below, are effective in imparting to such compositions improved solvent holdout properties. In general, useful perfluoroalkyl phosphate esters will have the formula:

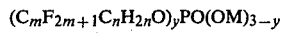

wherein:
m is an integer between 4 and 10;
n is an integer between 1 and 11;
y is 1 or 2; and
M is a water-solubilizing cation such as, for example, an alkali metal (Li, K, Na and the like), ammonium including methylamine, dimethylamine, diethylamine, monoethanolamine, diethanolamine, triethanolamine or morpholine and the like.

Preferred salts generally are the diethanolamine salts. Desirably, $C_m$ and $C_n$, taken together, constitute a straight chain of at least 8 carbon atoms. Such perfluoroalkyl phosphate esters are well-known materials and are available commercially or readily prepared by methods fully described in the art. Particularly preferred is the perfluoroalkyl phosphate ester manufactured by E. I. duPont de Nemours Company, Inc., Wilmington, Del., under the Trademark ZONYL RP and ZONYL FSE, which contain diethanolamine salts of mono- and bis-(1H,1H,2H,2H-perfluoroalkyl) phosphates where the alkyl group is even numbered in the range $C_8$ to $C_{18}$ and the salts have a fluorine content of 52.4 to 54.4 percent as determined on a solids basis. Also useful are fluorosurfactants such as ammonium bis(N-ethyl-2-perfluoroalkylsulfonamido ethyl) phosphates containing not more than 15 percent ammonium mono(N-ethyl-2-perfluoroalkylsulfonamido ethyl) phosphates, where the alkyl group is more than 95 percent $C_8$ and the salts have a fluorine content of 50.2 to 52.8 percent as determined on a solids basis. Materials of this type are sold by 3M Co., Inc., under the Trademark SCOTCHBAN.

Suitable stabilizers such as caustic, potassium hydroxide and ammonium hydroxide may be added to the polymer composition to control the pH of the polymer and impart temperature stability thereto.

The weight percent of the several components of the novel polymer composition of this invention may vary greatly. In general, they contain from 90 to 99.9 percent by weight electroconductive polymer and 0.1 to 10 percent by weight organic silicone.

The weight percent (dry coating) of the components in the coating formulations using the polymer composition of this invention may vary widely. In general, the electroconductive polymer composition of this invention will constitute from 5 to 95 percent by weight of the formulation; the binder will constitute from 5 to 80 percent by weight of the formulation. If desirable, the formulation may also contain from 5 to 95 percent by weight of a pigment. Such formulations are typical of the coating formulations typically employed in the manufacture of electroconductive base sheets.

The results set forth in the following tables illustrate the benefits of the organic silicone component in the electroconductive polymer compositions of the instant invention.

EXAMPLE 1

Coating colors were prepared and coated on a reprographic grade raw stock. The coated sheets were evaluated for solvent holdout, surface resistivity, coatweight and gloss. A zinc oxide top coating was applied, and the subsequent sheets were evaluated for print quality and tackiness of the backside conductive coating in a high pressure fusing mechanism obtained from a facsimile machine.

TABLE I

| Formulation | Weight Percent In Dry Coat | Weight Percent In Color | Dry Weight In Formulation | Weight "As Received" In Formulation |
| --- | --- | --- | --- | --- |
| CP-261LV | 25.0 | 10.0 | 20 | 50.0 |
| Lustra | 50.0 | 20.0 | 40 | 61.5 |
| Kofilm | 24.0 | 9.6 | 19.2 | 76.8 |
| Dow Corning AF | 1.0 | 0.4 | 0.8 | 1.6 |
| Water | — | — | — | 10.1 |

CP-261LV is a low viscosity homopolymer of diallyldimethylammonium chloride.
Lustra is a No. 1 kaolin coating clay.
Kofilm is acetylated starch.
Dow Corning AF is dimethylpolysiloxane, formulated with emulsifiers.

Tackiness of Conductive Coated Sheets Topcoated With Zinc Oxide Electrofax Coating Apparatus: pressure toner fusion rolls from a facsimile machine Drawdowns were conditioned at approximately 83 percent relative humidity.

| Backside Coatweight (lbs./3,000 ft.$^2$) | Observation of Backside of Coated Sheet Through Pressure Rolls |
| --- | --- |
| 1.9 | Straight through, no coating picked up on the rolls |

The print quality of zinc oxide coated sheets in SCM copier was good.

I claim:

1. An electroconductive polymer composition having improved tack properties which contains from 90 to 99.9 percent by weight of a water-soluble cationic quaternary ammonium electroconductive polymer and from 0.1 to 10 percent by weight of the polymer composition of dimethylpolysiloxane.

2. An electroconductive polymer composition as in claim 1 in which the cationic-quaternary ammonium polymer is a member selected from the group consisting of poly-(diallyldimethylammonium chloride), a copolymer of diallyldimethylammonium chloride and diacetone acrylamide or N-methylolacrylamide, polyvinylbenzyl trimethyl ammonium chloride, polymethacryloyloxyethyl trimethyl ammonium chloride, polymethacryloyloxyethyl trimethyl ammonium methosulfate, polyepichlorohydrin quaternized with trimethylamine or dimethylamine, copolymers of acrylamide and methacryloyloxyethyl trimethyl ammonium chloride containing from 90 to 99.5 percent methacryloyloxyethyl monomer, and poly(methacryloyloxyethyl dimethyl hydroxyethyl ammonium chloride).

3. An electroconductive polymer formulation having improved tack properties which contains from 5 to 95 percent by weight of a water-soluble cationic quaternary ammonium electroconductive polymer, 5 to 80 percent by weight of one or more binders, 5 to 95 percent of one or more pigments, and 0.1 to 10 percent of dimethylpolysiloxane.

* * * * *